Figure 1:
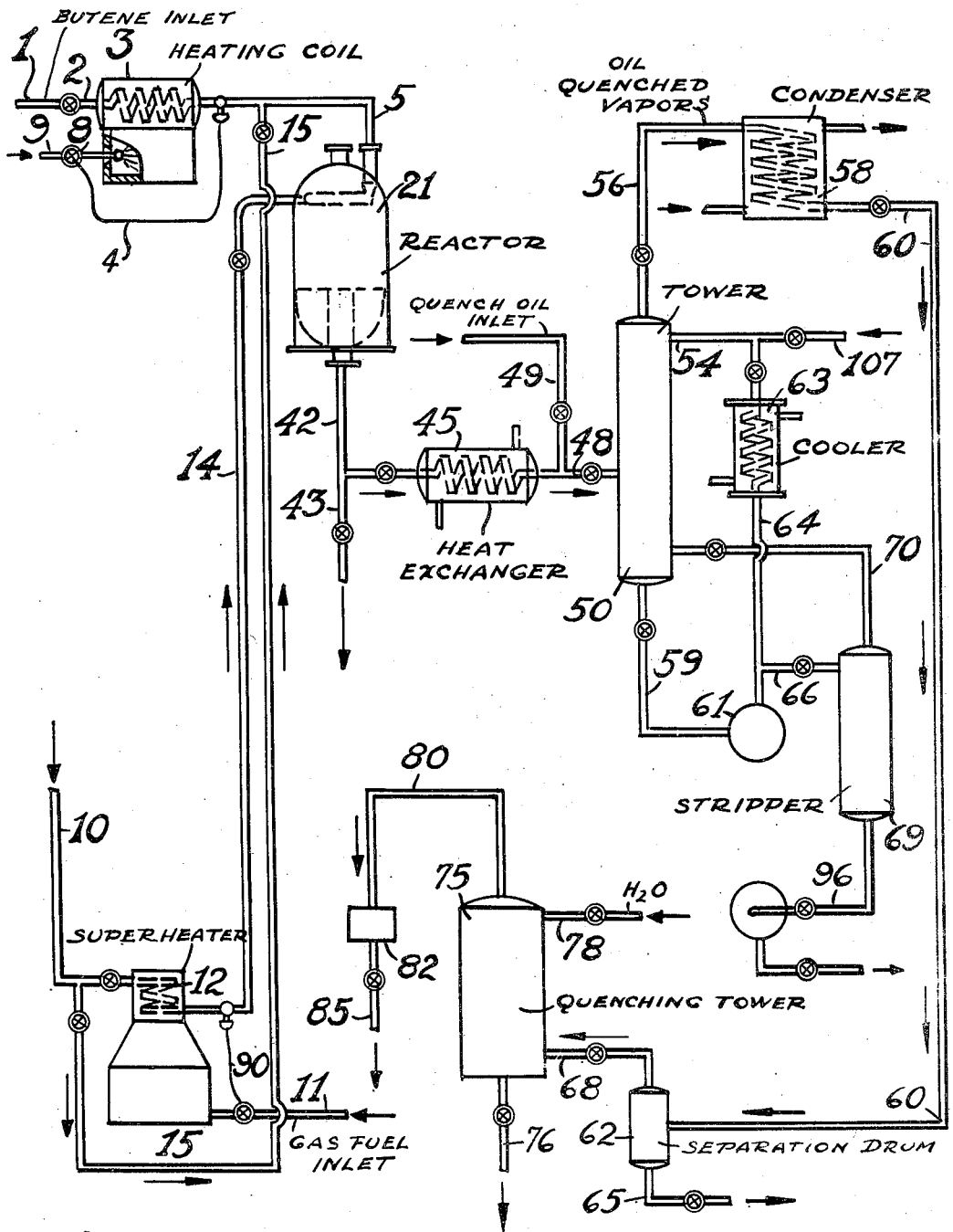

Oct. 4, 1949.     C. E. KLEIBER ET AL     2,483,494
CATALYTIC CONVERTER
Original Filed May 12, 1943     2 Sheets-Sheet 2
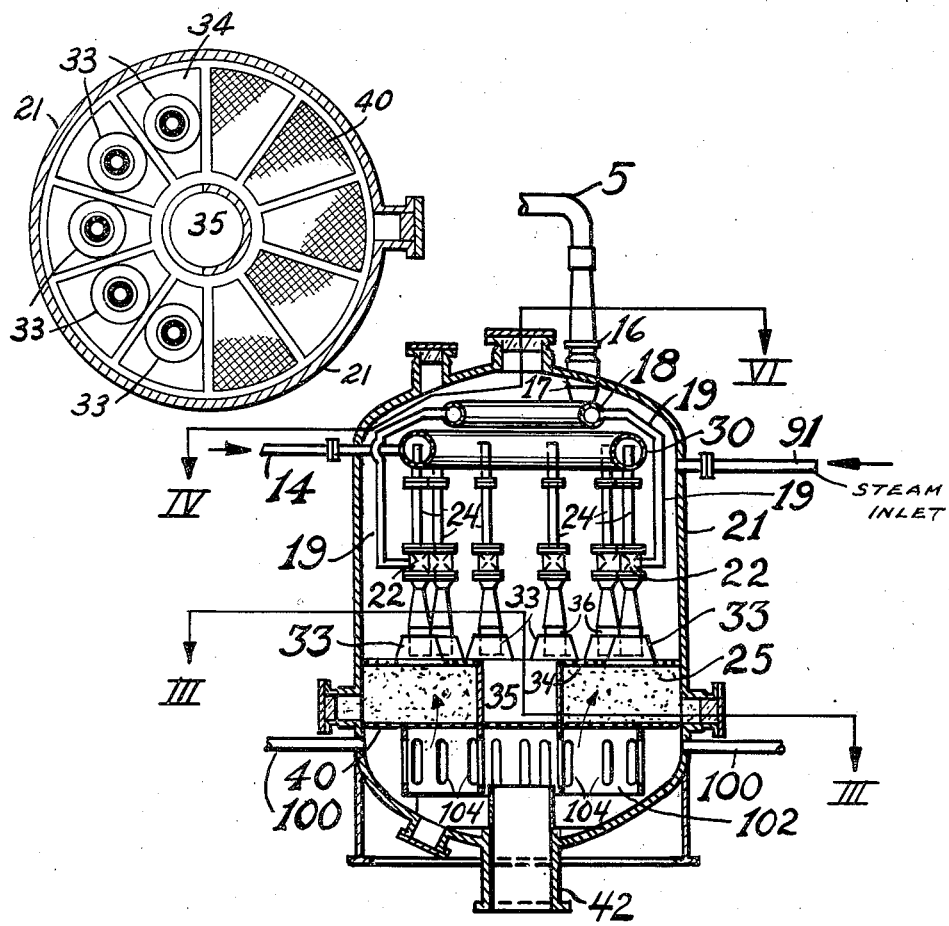
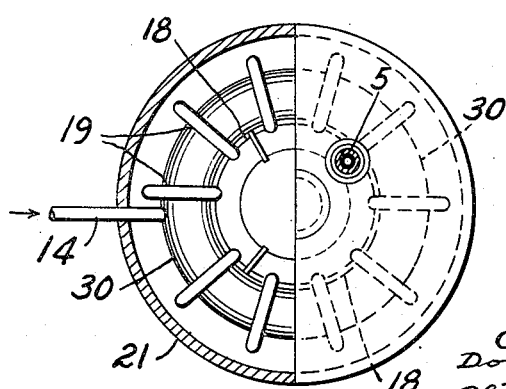

Patented Oct. 4, 1949

2,483,494

UNITED STATES PATENT OFFICE 2,483,494

CATALYTIC CONVERTER

Carl E. Kleiber, Irvington, Donald L. Campbell, Short Hills, Daniel E. Stines, Plainfield, and Channing C. Nelson, Cranford, N. J., assignors to Standard Oil Development Company, a corporation of Delaware Original application May 12, 1943, Serial No. 486,636. Divided and this application April 7, 1945, Serial No. 587,170

2 Claims. (Cl. 23—288)

This invention relates to equipment for the catalytic dehydrogenation of normally gaseous hydrocarbons in a continuous operation under closely controlled conditions of time, temperature and pressure whereby improved results are achieved. In particular, the present invention relates to equipment for the dehydrogenation of olefins such as normal butenes (the word "butenes" when used hereinafter refers to normal butenes) to form diolefins such as butadiene or for the dehydrogenation of alkylated aromatic such as ethyl benzene to form styrene.

This application is a division of application Serial No. 486,636, filed May 12, 1943, now Patent No. 2,414,816.

The dehydrogenation of butenes to form butadiene is a reaction which is preferably conducted at relatively low partial pressures. Thus, butenes in the presence of a suitable catalyst may be dehydrogenated to form butadiene, but ordinarily the partial pressure should be relatively low in the reaction zone, and the contact time or the residence of the reactants should be sufficiently short, preferably less than 2 seconds, to prevent the occurrence of undesired side reactions and consequent loss in yield of the desired butadiene. Also, the length of time the reactants are held at relatively high temperature before contact with the catalyst and that the products of reaction are held at relatively high temperature after contact with the catalyst should be minimized for similar reasons.

One object of our present invention is to provide an apparatus in which the dehydrogenation can be effected of butenes to butadiene in the presence of a catalyst under conditions which afford a maximum yield of butadiene from a given quantity of butenes charging stock, consistent with a high rate of production of butadiene for a given investment in manufacturing equipment.

A more specific object of our invention is to provide means for preheating the butenes to reaction temperatures which will permit closely controlling the reaction time and the time the reactants and products are maintained at high temperature and thus obviate the tendency toward undesired side reactions and decomposition of the butadiene formed.

A still further object of our invention is to provide means for rapidly heating the feed stock, such as butenes, to reaction temperatures, rapidly forcing the said feed stock through a bed of catalyst, promptly withdrawing the reaction products from contact with the catalyst and quenching the reaction products below temperatures which cause degradation of the desired diolefins.

A further object of our invention is to furnish an apparatus in which butenes may be preheated, dehydrogenated, quenched and butadiene recovered therefrom, in substantial yields, the apparatus being advantageous for continuous processing and furnished with automatic means responsive to temperature conditions prevailing at some point in the system.

Another object of this invention is to furnish an apparatus in which the dehydrogenation of butenes to butadiene may be effected under low partial pressure conditions to prevent undesired side reactions.

Other and further objects of our invention will appear from the following more detailed description and claims.

To the accomplishment of the foregoing and related ends, in general, we provide a plant layout adopted to carry out the following process: To superheat steam to a temperature above the dehydrogenation reaction temperature and then discharge it into a mixing zone where it intermixes with butenes, the butenes being previously heated to a temperature somewhat below their active reaction temperature. The butenes are heated to reaction temperature by mixing with the superheated steam. Thereafter, the mixture then contacts a suitable catalyst. The reaction products are withdrawn from the reaction zone, promptly quenched to a temperature below those at which undesirable side reactions take place, and thereafter the reaction products are fractionated, solvent extracted, and otherwise treated to recover the desired butadiene.

Having set forth the objects of our invention and a general statement of our invention, we now refer to the accompanying drawing for a better understanding of our invention. In describing the details of the drawing, we shall illustrate its use in butene dehydrogenation.

In Fig. I we have illustrated diagrammatically an apparatus in which a preferred modification of our invention may be carried into practical effect; in Fig. II we have shown a preferred form of reactor in vertical section; in Fig. III we have shown a plan section taken along III—III of Fig. II, of our reactor partly broken to show the internal construction; in Fig. IV we have shown a second plan section of the reactor taken along IV—IV of Fig. II.

Referring in detail to Figs. I to IV, butenes are introduced into the system through line 1 and thence passed through a furnace 3 where they are heated to a temperature of from 1000 to 1250° F. or thereabouts, thence withdrawn at this temperature through line 5 and discharged into the top of reactor 21 (see in particular Fig. II), the preheated olefin entering through a nozzle 16, an inner projection 17 within the reactor shell extending into a ring manifold 18 disposed laterally in an upper portion of said reactor. As shown, particularly in Fig. II, reactor 21 is of the drum type, preferably insulated.

The rate of flow of fuel (preferably a gas or liquid) burned in the furnace 3 is automatically regulated by the temperature of the butenes stream at or near the outlet of the furnace. This regulator means, indicated by 4 on Fig. I may be any conventional device disposed in communication with line 5 and flow control valve 8 in fuel feed line 9 whereby the rate of flow of fuel to furnace 3 is responsive to the temperature at or near the outlet of the butene from said furnace.

In respect of the steam, the latter from some source is introduced through line 10 (see Fig. I), then passes through a superheater 12, and thence passes through pipe 14 into the ring manifold 30 in reactor 21. A control 90 is utilized in the steam superheater furnace hereinbelow described to control the rate of flow of fuel entering superheater 12 through the line 11. It will be noted that the circular butene manifold 18 carries a plurality of taps or draw-off pipes 19 which terminate at their lower ends in mixing means 22 disposed in a series of vertical pipes 24. The vertical pipes 24 are in communication with the said ring manifold 30 containing, as indicated, superheated steam. The upper ends of said pipes 24 project into manifold 30, substantially above the lower surface of said manifold so that the steam passing through the manifold tends to deposit any solid particles such as scale which it may contain and these particles are prevented from passing into the mixing means 22 and/or into the catalyst bed 25. Similar means (not shown) may be provided at the points where the butenes leave manifold 18 through lines 19. The superheated steam, which is at a temperature of about 1400° F., passes from the manifold 30 through the pipes 24 into mixing means 22. Preferably the mixing means 22 are Venturi tubes their lower extremities projecting to points in close proximity to the bed of catalyst, and their functions are to cause immediate mixing of butene and superheated steam flowing therethrough with a consequent rise of the temperature of the butene to reaction inlet temperatures, namely, about 1200° F. to 1300° F., and to cause the mixture to flow into the said bed of catalyst. Since a Venturi tube is a well known structure it need not be illustrated in detail. Other suitable mixing means may be employed for mixing the steam and butenes.

The process is so operated preferably, that for each volume of butene, 8–10 volumes of superheated steam are discharged into the Venturi tubes. The mixture of steam and butene, as indicated, passes into the annular bed of catalyst 25. This bed of catalyst preferably is 1 ft. 6 inches to 6 ft. thick and is manually placed in the reactor in a relatively loosely packed form with a levelled upper surface. The catalyst bed 25 in the modification shown is annularly disposed around a central cylindrical open space 35 so that the reactants may be uniformly distributed to the upper surface of the catalyst bed 25, also, as an aid in filling the bed space with catalyst and removing the spent catalyst when desired. The number of pipes 24 discharging steam and butene into the bed of catalyst may vary. We have shown ten, but more or less may be employed. In order to prevent the gaseous mixture from flowing upwardly into the space above the catalyst bed 25 or in any direction except downwardly through the bed of catalyst 25, we provide hooded metallic members 33 about the lower extremities of mixing nozzles 22 and in contacting relation with a screen member 34 resting on the upper surface of the bed of catalyst 25. The lower portion of the mixing nozzles is cylindrical in shape and is machined to provide close clearance within the sleeves 36 of the above-mentioned hooded members 33 which sleeves are adapted for vertical adjustment. Thus, these members 33 rest upon the screen member 34, which in turn is supported by the catalyst bed 25 and although the mixing means 22 may move relative to the catalyst bed 25 the flow between the mixing means and the catalyst bed is maintained confined. Steam may be continuously bled through line 91 into the upper part of the reaction chamber 21 under a sufficient pressure to cause it to pass continually into the catalyst bed 25 through any small openings available. These openings may include the small spaces between the hooded members 33 and the mixing nozzles 22 and between the edge of the hooded members 33 and the screen member 34 and between the screen member 34 and the inside wall of the reaction chamber 21. This flow of steam tends to prevent butenes from entering the upper part of the reaction chamber 21 above the catalyst bed 25 and there being converted by side reactions into undesirable products. The catalyst itself is preferably a catalyst consisting essentially of iron oxide, magnesium oxide, copper oxide and potassium oxide. A preferred composition consists essentially of the following in weight per cent MgO, 72.4; $Fe_2O_3$, 18.4; CuO, 4.6; $K_2O$, 4.6. Other proportions may be used, e. g., the MgO may vary from 50–95%, the $Fe_2O_3$ from 3 to 49%, the CuO from 0.5 to 10%, and the $K_2O$ from 0.5 to 10%. This catalyst has the advantage of being resistant to injury by contact with steam and hence is quite superior to other catalysts such as molybdenum oxide or chromium oxide supported on activated alumina which are deactivated by contact with steam. The catalyst itself is preferably in the form of extruded lengths having a diameter of $\frac{1}{8}$ inch and a length of $\frac{1}{8}$ inch, although it may alternatively be in the form of granules, lumps, shaped bodies, etc.

The velocity of the mixture of steam and butene through the catalyst bed is such that the contact time between the reactants and catalyst is of the order of one-half second, although contact times of from 0.05 to 2 seconds give good results. We prefer to operate under conditions such that the partial pressure of the butene as it enters the bed of catalyst is from 25 to 200 millimeters mercury absolute pressure. The reaction products are withdrawn through a foraminous member 40 which also serves as a support for the bed of catalyst, are sprayed with water at atmospheric temperature or thereabouts, sprayed or injected through pipes 100 into the reactor below the bed of catalyst 25 in order to cool the products rapidly to 900 to 1000° F., and then are withdrawn through a draw-off pipe 42.

It will be noted, in further describing the structural features of the reactor 21, that a ring 102, carrying slots 104 permitting ingress of gas or vapors into the ring, serves as a support for the catalyst bed 25. The gaseous products pass from bed 25 uniformly from its lower surface and of course those which are withdrawn outside ring 102, pass into the rings through ports 104, whence the said products pass into pipe 42 whose upper end projects into the said ring.

Referring again to Fig. I, the gaseous mixture in line 42 is discharged through a waste heat boiler 45 where its temperature is further reduced, say to around 500–600° F. The gaseous mixture is withdrawn through line 48 from waste heat boiler 45 and is further cooled by the addition of cool quench oil through line 49. The gaseous mixture then passes from valved line 48 into a quenching tower 50 where it flows upwardly against downflowing oil introduced into the top of the tower 50 through inlet pipe 54. The quenching oil is preferably at a temperature of 150–250° F., and this oil serves to further cool the vapors to a temperature of 300° F. The gaseous mixture is withdrawn through line 56 and discharged into a cooling and partial condensing zone 59 where it is further cooled to a temperature of 185° F., thence withdrawn through line 60 and delivered to a separating drum 62. A liquid product is withdrawn from separation drum 62 through bottom draw-off pipe 65, while the butadiene-containing gases are withdrawn overhead through line 68 and delivered to a second quenching tower 75 where they are quenched with water at atmospheric temperature discharged into said quenching tower through a pipe 78. The gases now cooled to approximately atmospheric temperature are withdrawn from quenching tower 75 through line 80 and then are delivered to compressing system 82 where they are partially liquefied and thence delivered to conventional fractionation, butadiene extraction, and purification equipment (not shown) by way of valved line 85. Water is withdrawn from tower 75 through line 76.

While we have shown one reactor in the drawing, we prefer to use several reactors. This is principally for reason that the use of catalyst to promote the reaction causes deposition of carbonaceous material upon the catalyst so that eventually the activity of the catalyst is reduced to the point where it becomes necessary to regenerate the catalyst by removing the carbonaceous material. The use of two or more reaction chambers permits regenerating the catalyst bed in one chamber while the other catalyst bed or beds is in use in promoting the reaction. Thus, the stream of reactants may be kept flowing continuously being transferred from one or more reactors to the same number of other reactors whenever it is desired to regenerate a catalyst bed.

During the regeneration of the catalyst in reactor 21, we direct the flow of a portion of the steam from line 10 through a branch line 15, by-passing the superheater 12 so as to discharge steam into the reactor at a temperature of 1100–1300° F. The steam converts the carbonaceous material fouling the catalyst according to the water gas reaction into $H_2$, $CO$ and $CO_2$ and these gaseous materials may be withdrawn from the system through lines 42 and 43. Preferably this hot gas is passed through waste heat boiler 45 or the like to recover at least a portion of its sensible heat.

Referring to the quenching tower 50, the quenching oil which is withdrawn from the bottom through line 59 is pumped by pump 61 through a cooler 63, by way of line 64, and thence recycled to inlet pipe 54. A portion of the oil from tower 50 is continuously withdrawn through line 66, discharged into a stripper 69 from which it is withdrawn for rejection. Fresh oil is added through line 107. The purpose of stripper 69 is to remove butadiene and butenes from the oil which is to be withdrawn from the system through line 96 for disposal. The said butadiene and butenes are returned to tower 50 through line 70 in vapor form.

As hereinbefore mentioned, the temperature of the butenes entering the reaction chamber 21 through line 5 may be controlled automatically as may also be the temperature of the superheated steam entering the reaction chamber 21 through line 14. Since the rates of flow of both streams may also be controlled, the temperature of the mixed butenes and steam entering the catalyst bed may be thus indirectly controlled. Let us suppose that an inlet temperature for the mixture of 1200° F. is the most desirable for a catalyst, freshly made. Then, after a considerable period of time during which this catalyst ages because it has been subjected to periods in which it has been used to promote reaction and between periods regenerated, it is necessary and desirable to increase the temperature of the mixture entering the catalyst because of lowered activity of the aged catalyst. This may preferably be accomplished by increasing the temperature of the stream of butenes flowing through line 5 or of the stream of steam flowing through line 14 or both, rather than by changing the rates of flow of either steam or butenes and thus reducing throughput or capacity.

The time of contact of the mixture of steam and butenes with the catalyst may be varied by shutting down the apparatus and changing the amount of catalyst in the bed 25. For convenience, pipes 19 and 24 are provided with spool pieces to permit maintaining contact between the hooded members 33 and the bed 25, whether the said bed is relatively thick or thin.

It is customary practice in most hydrocarbon processing units to start them by first purging the unit of air with steam and then passing hydrocarbon through the unit. This avoids fires and explosions. However, this practice is not suitable in starting a unit of the type described, because if equipment at substantially atmospheric temperature and containing catalyst were exposed to a current of steam, a portion of the steam would give up sufficient heat to the bed and the metal portions of the reaction chamber to cause condensation and the water thus formed would damage the catalyst. Therefore, means must be provided to free the apparatus of air in a different manner. We prefer, in initiating operations to pass air through a heat exchanger or furnace and thence through the catalyst bed until the temperature of the latter is raised to a point just above where such steam condensation would occur. The air supply is discontinued and superheated steam is passed. The apparatus required for heating the catalyst with air is not separately shown, but use may be made of a portion of the compression equipment shown, for compressing air, and of the furnaces normally used for heating normal butenes and steam.

What is claimed is:

1. A reactor for carrying out high temperature short time catalytic reactions, which comprises a vertical cylindrical reactor shell, a horizontal catalyst bed dividing the shell into upper and lower portions, distributing pipes in the upper portion of the shell for separate reactant vapors, mixing means for admixing said vapors conveyed separately thereto from the distributing pipes, a vertically disposed nozzle associated with said mixing means for discharging the mixed vapors in a confined stream downwardly toward an upper surface of the catalyst bed spaced below the lower extremity of the nozzle, and a hood member about the lower portion of the nozzle with a clearance therefrom for vertical adjustment of said hood member by independent motion with respect to the nozzle, said hood member being supported in position by contacting relationship with the catalyst bed whereby the mixed vapors are discharged from the nozzle flow in a confined stream directly into the upper surface of the catalyst bed.

2. Reactor apparatus according to claim 1, in which a plurality of said mixing means and associated nozzles are in the form of Venturi nozzles having cylindrical lower portions about which each hood member has a sleeve fit, and each of the hood members rests upon a screen member, which in turn is supported by the catalyst bed.

CARL E. KLEIBER.
DONALD L. CAMPBELL.
DANIEL E. STINES.
CHANNING C. NELSON.

REFERENCES CITED

The following references are of record in the file of this patent:

UNITED STATES PATENTS

| Number | Name | Date |
| --- | --- | --- |
| 2,399,560 | Murphree | Apr. 30, 1946 |